(12) United States Patent
Kawabe

(10) Patent No.: US 11,165,071 B2
(45) Date of Patent: Nov. 2, 2021

(54) SEPARATOR FOR FUEL CELL

(71) Applicant: TOYOTA BOSHOKU KABUSHIKI KAISHA, Aichi-ken (JP)

(72) Inventor: Satoshi Kawabe, Ichinomiya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 9 days.

(21) Appl. No.: 16/750,491

(22) Filed: Jan. 23, 2020

(65) Prior Publication Data
US 2020/0251749 A1    Aug. 6, 2020

(30) Foreign Application Priority Data

Jan. 31, 2019 (JP) .............. JP2019-016134

(51) Int. Cl.
*H01M 8/026* (2016.01)
*H01M 8/0206* (2016.01)
*H01M 8/0256* (2016.01)
*H01M 8/1006* (2016.01)

(52) U.S. Cl.
CPC ......... *H01M 8/026* (2013.01); *H01M 8/0206* (2013.01); *H01M 8/0256* (2013.01); *H01M 8/1006* (2013.01)

(58) Field of Classification Search
CPC .. H01M 8/0256; H01M 8/026; H01M 8/0206; H01M 8/1006
See application file for complete search history.

(56) References Cited

U.S. PATENT DOCUMENTS 6,490,778 B1 * 12/2002 Funatsu .............. H01M 8/0258
29/557

FOREIGN PATENT DOCUMENTS

JP    2016-066531    4/2016
JP    2016066531  *  4/2016

* cited by examiner

*Primary Examiner* — Olatunji A Godo
(74) *Attorney, Agent, or Firm* — Greenblum & Bernstein, P.L.C.

(57) ABSTRACT

A separator for a fuel cell includes a metal separator base, crest sections, and a trough sections. Regions surrounded by the respective trough sections and a corresponding electrode layer each constitute a passage that supplies oxidation gas or fuel gas to the electrode layer. A first thin film is placed over the entire surfaces of the crest sections and the trough sections that face the corresponding electrode layer. The first thin film has conductivity and a corrosion resistance higher than that of the separator base. A second thin film having conductivity is placed at least on each of the parts of the first thin film that are placed on top surfaces of the crest sections. The second thin film on the top surface of each crest section has a groove. At least one end of the groove is connected to the passage.

4 Claims, 3 Drawing Sheets

SEPARATOR FOR FUEL CELL

BACKGROUND

1. Field

The present disclosure relates to a separator for a fuel cell that is arranged between membrane electrode assemblies in a fuel cell.

2. Description of Related Art

FIG. 4 shows a conventional fuel cell 70 disclosed in Japanese Laid-Open Patent Publication No. 2016-66531. The fuel cell 70 includes membrane electrode assemblies (MEA) 71 and separators 75. The separators 75 are located on the opposite sides of each membrane electrode assembly 71 in the thickness direction (the up-down direction in FIG. 4) and sandwich the membrane electrode assembly 71. The membrane electrode assembly 71 includes an electrolyte membrane 72 and two electrode layers arranged on the opposite sides of the electrolyte membrane 72 in the thickness direction. One of the electrode layers constitutes a cathode electrode layer 73, and the other electrode layer constitutes an anode electrode layer 74. In the fuel cell 70, the membrane electrode assemblies 71 are separated by the separators 75 such that each membrane electrode assembly 71 is sandwiched between the separators 75 on the opposite sides in the thickness direction.

Each separator 75 includes a separator base 76, which is made of metal having conductivity. Each separator base 76 has multiple crest sections 77, which protrude toward the membrane electrode assembly 71, and multiple trough sections 78, which are recessed in the direction opposite to the protruding direction of the crest sections 77. The crest sections 77 and the trough sections 78 are alternately arranged in a direction along the plane of the membrane electrode assembly 71 (the left-right direction in FIG. 4) and extend parallel to each other.

Regions surrounded by the respective trough sections 78 and the cathode electrode layer 73 each constitute a passage 81 that supplies oxidation gas to the cathode electrode layer 73. Regions surrounded by the respective trough sections 78 and the anode electrode layer 74 each constitute a passage 82 that supplies fuel gas to the anode electrode layer 74.

A thin film 85 having conductivity is placed on the top surface of each crest section 77. The thin films 85 are provided to suppress increase in the contact resistance between the membrane electrode assembly 71 and the separator base 76 of each separator 75 so as to reduce the influence of the contact resistance on the reaction of fuel gas and oxidation gas in the membrane electrode assembly 71. The contact resistance refers to electric resistance in the area including the interface between two objects when the objects are brought into contact with each other and a current is passed through the objects.

In the above-described fuel cell 70, when fuel gas is supplied to the anode electrode layer 74 and oxidation gas is supplied to the cathode electrode layer 73, power is generated based on the reaction of the fuel gas and the oxidation gas in the membrane electrode assembly 71. At this time, water is generated in the cathode electrode layer 73 with the reaction. Part of the generated water is located between the cathode electrode layer 73 and each thin film 85. A portion of the water that is close to the passages 81 flows along with the oxidation gas that flows through the passages 81 at a high flow velocity and is discharged to the outside of the fuel cell 70.

However, a portion of the water that is away from the passages 81 is not discharged to the outside of the fuel cell 70 by the flow of oxidation gas through the passages 81, but remains between the cathode electrode layer 73 and the thin films 85. The remaining water may cause insufficient diffusion of oxidation gas. This may diminish the reaction of fuel gas and oxidation gas.

The power generation efficiency can be improved by soaking the cathode electrode layer 73 and the anode electrode layer 74 with a certain amount of water. In this regard, the thickness of the membrane electrode assembly 11 may be reduced. This allows the water generated in the cathode electrode layer 73 to readily move toward the anode electrode layer 74 along the electrolyte membrane 72. However, if more water than necessary is retained between the respective thin films 85 and the anode electrode layer 74, and surplus water remains in the vicinity of the anode electrode layer 74, fuel gas cannot readily contact the anode electrode layer 74. This can reduce the reaction of fuel gas and oxidation gas.

SUMMARY

Accordingly, it is an objective of the present disclosure to provide a separator for a fuel cell that improves the discharge performance for water generated with power generation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a separator for a fuel cell is provided. The separator is used in a fuel cell having a membrane electrode assembly. The membrane electrode assembly includes an electrolyte membrane and electrode layers joined to opposite sides of the electrolyte membrane in a thickness direction. The separator for a fuel cell includes a metal separator base, a plurality of crest sections, and a plurality of trough sections. The metal separator base is arranged on an outer side of the membrane electrode assembly in the thickness direction and has conductivity. The crest sections are provided in the separator base and protrude toward the membrane electrode assembly. The trough sections are provided in the separator base and recessed in a direction opposite to a direction in which the crest sections protrude. The crest sections and the trough sections are alternately arranged in a direction along a plane of the membrane electrode assembly and extend parallel to each other. Regions surrounded by the respective trough sections and a corresponding electrode layer each constitute a passage that supplies oxidation gas or fuel gas to the electrode layer. A first thin film having conductivity and a corrosion resistance higher than that of the separator base is placed over entire surfaces of the crest sections and the trough sections that face the corresponding electrode layer. A second thin film having conductivity is placed at least on each of parts of the first thin film that are placed on top surfaces of the crest sections. The second thin film on the top surface of each crest section has a groove. At least one end of the groove is connected to the passage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A separator for a fuel cell according to one embodiment will now be described with reference to FIGS. 1 and 2.

Figure 1:
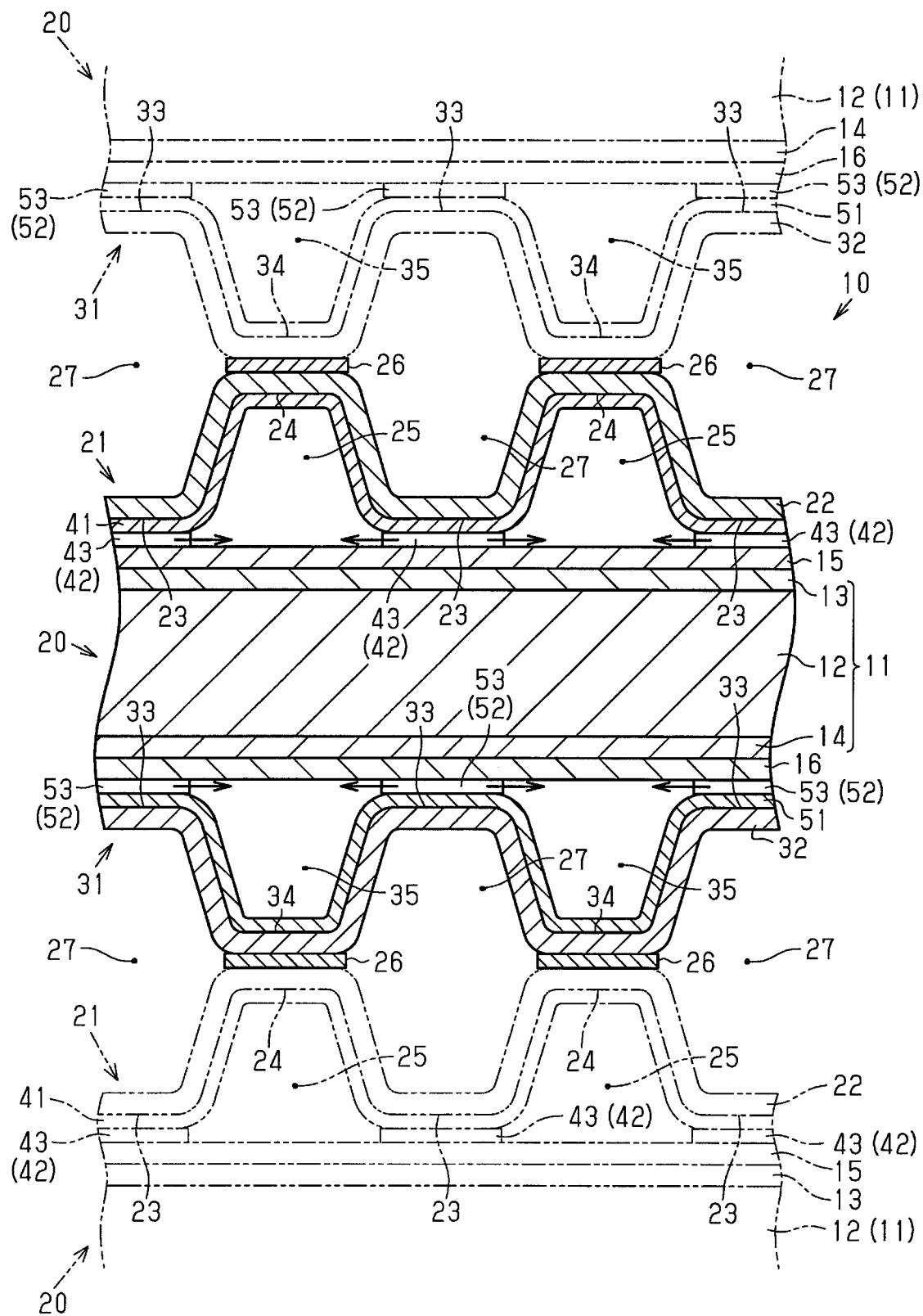
FIG. 1 is a partial cross-sectional view of a fuel cell according to an embodiment.

As shown in FIG. 1, a fuel cell 10 includes membrane electrode assemblies 11. Each membrane electrode assembly 11 is sandwiched by separators for a fuel cell from the opposite sides in the thickness direction (the up-down direction in FIG. 1). To distinguish the two separators for a fuel cell from each other, the one located above each membrane electrode assembly 11 (one of the outer sides in the thickness direction) will be referred to as a first separator 21, and the one located below (the other outer side in the thickness direction) will be referred to as a second separator 31.

The membrane electrode assemblies 11 are separated from each other by the first separator 21 and the second separator 31 arranged in between. Each membrane electrode assembly 11 includes an electrolyte membrane 12 and two electrode layers joined to the opposite sides of the electrolyte membrane 12 in the thickness direction. One (the upper one in FIG. 1) of the electrode layers constitutes a cathode electrode layer 13, and the other electrode layer (the lower one in FIG. 1) constitutes an anode electrode layer 14.

A gas diffusion layer 15 is arranged on the opposite side (the upper side in FIG. 1) of the cathode electrode layer 13 from the electrolyte membrane 12. The gas diffusion layer 15 is made of carbon fiber or the like and promotes diffusion of oxidation gas, which will be discussed below. A gas diffusion layer 16 is arranged on the opposite side (the lower side in FIG. 1) of the anode electrode layer 14 from the electrolyte membrane 12. The gas diffusion layer 16 is made of carbon fiber or the like and promotes diffusion of fuel gas, which will be discussed below.

The first and second separators 21, 31 sandwich the membrane electrode assembly 11 and the gas diffusion layers 15, 16 from the opposite sides (the outer sides) in the thickness direction. The membrane electrode assembly 11, the gas diffusion layers 15, 16, the first separator 21, and the second separator 31 constitute a cell unit 20. Multiple cell units 20 are stacked in the thickness direction to constitute the cell stack of the fuel cell 10.

Figure 2:
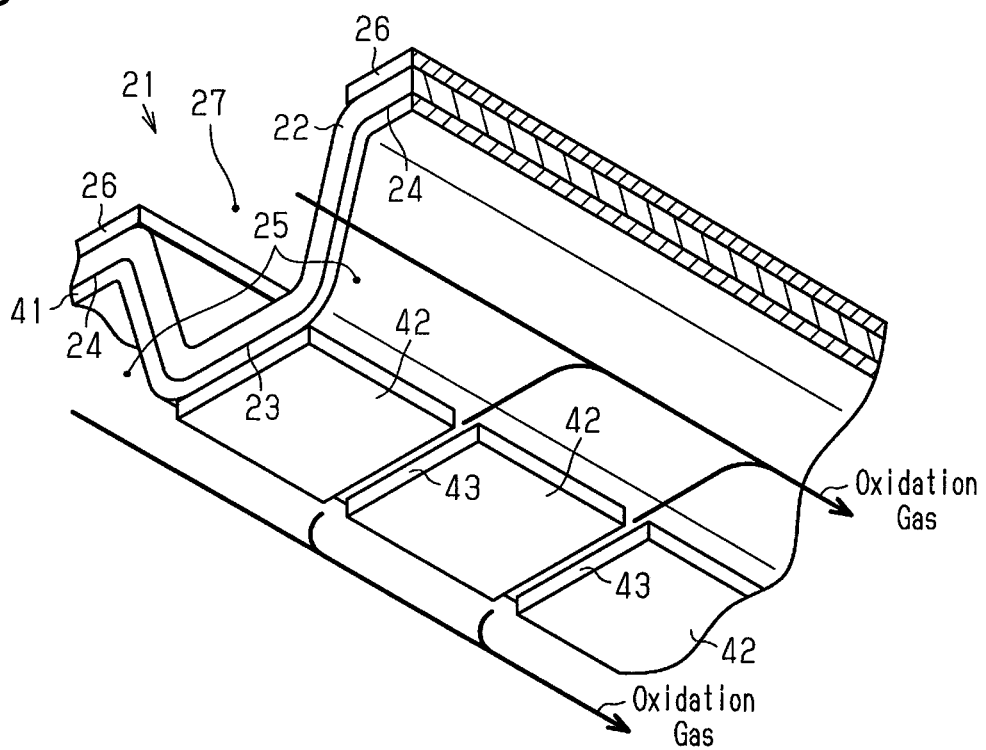
FIG. 2 is a partial perspective view of a first separator according the embodiment.

As shown in FIGS. 1 and 2, the framework of each first separator 21 is constituted by a separator base 22, which is made of metal having conductivity. In the present embodiment, each separator base 22 is made of a stainless steel plate having a thickness of about 100 µm.

Each separator base 22 has multiple crest sections 23, which protrude toward the membrane electrode assembly 11, and multiple trough sections 24, which are recessed in the direction opposite to the protruding direction of the crest sections 23. In FIGS. 1 and 2, the crest sections 23 protrude downward, and the trough sections 24 are recessed upward. The crest sections 23 and the trough sections 24 are alternately arranged in a direction along the plane of the membrane electrode assembly 11 (the left-right direction in FIG. 1) and extend parallel to each other. Regions surrounded by the respective trough sections 24 and the cathode electrode layer 13 each constitute a passage 25 that supplies oxidation gas (for example, air) to the cathode electrode layer 13.

As shown in FIG. 1, the framework of each second separator 31 is constituted by a separator base 32, which is made of metal having conductivity. In the present embodiment, each separator base 32 is made of a stainless steel plate having a thickness of about 100 µm, as in the case of the above-described separator base 22.

Each separator base 32 has multiple crest sections 33, which protrude toward the membrane electrode assembly 11, and multiple trough sections 34, which are recessed in the direction opposite to the protruding direction of the crest sections 33. In FIG. 1, the crest sections 33 protrude upward, and the trough sections 34 are recessed downward. The crest sections 33 and the trough sections 34 are alternately arranged in a direction along the plane of the membrane electrode assembly 11 (the left-right direction in FIG. 1) and extend parallel to each other. Regions surrounded by the respective trough sections 34 and the anode electrode layer 14 each constitute a passage 35 that supplies fuel gas (for example, hydrogen) to the anode electrode layer 14.

As described above, the cell stack of the fuel cell 10 includes multiple cell units 20, which are stacked in the thickness direction. Thus, as represented by the long dashed double-short dashed lines in FIG. 1, the second separator 31 of the cell unit 20 located above is arranged above the first separator 21 of the cell unit 20 located in the center in the up-down direction in FIG. 1. An intervening layer 26 is arranged between the bottom of each trough section 24 of the first separator 21 and the bottom of the trough section 34 of the second separator 31 located above. The intervening layers 26 are configured to suppress increase in the contact resistance between the trough sections 24, 34. The intervening layers 26 are made of a material that has a conductivity higher than (an electric resistance value lower than) that of the separator bases 22, 32. For example, the intervening layers 26 are made of carbon, gold, or platinum. Further, a passage 27 is defined between each crest section 23 of the first separator 21 and the corresponding crest section 33 of the second separator 31 located above. Coolant (for example, cooling water) flows through the passage 27.

Likewise, as represented by the long dashed double-short dashed lines in FIG. 1, the first separator 21 of the cell unit 20 located below is arranged below the second separator 31 of the cell unit 20 located in the center in the up-down direction in FIG. 1. An intervening layer 26 is arranged between the bottom of each trough section 34 of the second separator 31 and the bottom of the corresponding trough section 24 of the first separator 21 located below. Further, a passage 27 is defined between each crest section 33 of the second separator 31 and the corresponding crest section 23 of the first separator 21 located below. Coolant flows through the passage 27.

As shown in FIGS. 1 and 2, a first thin film 41 is provided on the separator base 22 of the first separator 21 of each cell unit 20. Specifically, the first thin film 41 is placed over the entire surfaces of the crest sections 23 and the trough sections 24 that face the cathode electrode layer 13. The first thin film 41 has conductivity and a corrosion resistance higher than that of the separator base 22. In the present embodiment, the first thin film 41 is made of a material obtained by mixing conductive particles such as titanium nitride (TiN) into plastic.

Likewise, as shown in FIG. 1, a first thin film 51 is provided on the separator base 32 of the second separator 31 of each cell unit 20. Specifically, the first thin film 51 is placed over the entire surfaces of the crest sections 33 and the trough sections 34 that face the anode electrode layer 14. The first thin film 51 has conductivity and a corrosion resistance higher than that of the separator base 32.

As shown in FIGS. 1 and 2, a second thin film 42 is placed on each of the parts of the first thin film 41 that are placed on the top surfaces of the crest sections 23 in each first separator 21. The second thin films 42 are provided to suppress increase in the contact resistance between the membrane electrode assembly 11 and the separator bases 22 so as to reduce the influence of the contact resistance on reaction of fuel gas and oxidation gas in the membrane electrode assembly 11. The second thin films 42 are made of the same material as that of the intervening layers 26 and are formed through ink jet printing to have a thickness of, for example, several hundred nanometers to several hundred micrometers. The second thin films 42 have a hydrophilicity higher than that of the separator bases 22. Each first separator 21 contacts the gas diffusion layer 15 at the second thin films 42. In other words, each second thin film 42 of the first separator 21 indirectly contacts the cathode electrode layer 13 via the gas diffusion layer 15.

Each second thin film 42 has grooves 43, which extend in a direction intersecting with the direction in which the crest sections 23 extend. In the present embodiment, the grooves 43 extend in a direction orthogonal to the direction in which the crest sections 23 extend (the left-right direction in FIG. 1). The grooves 43 are separated from each other in the direction in which the crest sections 23 extend. The depth of the grooves 43 is set to be the same as the thickness of the second thin film 42. Thus, the first thin film 41 is exposed at positions where the grooves 43 are provided.

The passages 25 are located on the opposite sides of each crest section 23, on which the second thin film 42 having the grooves 43 are provided. In the second thin film 42 on the top surface of each crest section 23, one end of each groove 43 is connected to one of the passages 25, which are located on the opposite sides of the crest section 23, and the other end is connected to the other passage 25. Thus, the passages 25 on the opposite sides of each crest section 23 are continuous with each other through the grooves 43.

As shown in FIG. 1, a second thin film 52 is placed on each of the parts of the first thin film 51 that are placed on the top surfaces of the crest sections 33 in each second separator 31. Each second thin film 52 is provided for the same purpose, made of the same material, by the same method, of the same thickness and the same hydrophilicity as the second thin films 42 on the first separator 21. The second separator 31 contacts the gas diffusion layer 16 at the second thin films 52 provided on the respective crest sections 33. Each second thin film 52 has grooves 53, which extend in the same direction as the grooves 43 of the first separator 21. In the second thin film 52 on the top surface of each crest section 33, one end of each groove 53 is connected to one of the passages 35, which are located on the opposite sides of the crest section 33, and the other end is connected to the other passage 35. The passages 35 on the opposite sides of each crest section 33 are thus continuous with each other through the grooves 53.

The above-described first separator 21 is manufactured in the following manner. First, a flat stainless steel plate is prepared. A material obtained by mixing conductive particles such as titanium nitride (TiN) into plastic is applied to the entire surface on one side of the stainless steel plate to form a first thin film 41. The stainless steel plate, on which the first thin film 41 has been formed in the above-described manner, is stamped to form a separator base 22 that has crest sections 23 and trough sections 24. A material having a conductivity higher than that of the separator base 22 is applied to parts of the first thin film 41 that are placed on the top surfaces of the crest sections 23 through ink jet printing to form second thin films 42 having grooves 43. The second separator 31 is manufactured through the same steps as the first separator 21.

The operation and advantages of the above-described embodiment will now be described.

In the fuel cell 10, oxidation gas (air) flows through the passages 25, and fuel gas (hydrogen) flows through the passages 35. The oxidation gas flowing through each passage 25 is supplied to the cathode electrode layer 13 via the gas diffusion layer 15. The fuel gas flowing through each passage 35 is supplied to the anode electrode layer 14 via the gas diffusion layer 16. Power is generated based on the reaction of the supplied fuel gas and oxidation gas in the membrane electrode assembly 11. The reaction also generates water in the cathode electrode layer 13, to which oxidation gas has been supplied.

Specifically, when fuel gas (hydrogen) is supplied to the anode electrode layer 14, electrons are removed from hydrogen atoms and delivered to the anode electrode layer 14. Those electrons flow to the cathode electrode layer 13 from the anode electrode layer 14 through lead wires of the external circuit (not shown). Removal of electrons from hydrogen atoms in the anode electrode layer 14 generates positively charged hydrogen ions (protons), which then move to the cathode electrode layer 13 via the electrolyte membrane 12. In the meantime, in the cathode electrode layer 13, to which oxidation gas (air) is supplied, oxygen atoms receive electrons to become oxygen ions. Further, hydrogen ions that have moved from the anode electrode layer 14 to the cathode electrode layer 13 via the electrolyte membrane 12 are bonded to the oxygen ions, so that water is generated in the cathode electrode layer 13.

Part of the generated water is located in the gas diffusion layer 15 between the cathode electrode layer 13 and each second thin film 42. A portion of the water that is close to each passage 25 is pulled toward the passage 25 by the oxidation gas flowing through the passage 25 as indicated by the arrows in FIG. 2. When moved into the passage 25, the water flows along with the oxidation gas through the passage 25. A portion of the water in the gas diffusion layer 15 that is close to each groove 43 is also pulled toward the passage 25 through the groove 43 by the oxidation gas as indicated by the arrows in FIG. 1. When moved into the passage 25, this water also flows along with the oxidation gas through the passage 25. As described above, the water that flows along with the oxygen gas through the passage 25 is ultimately discharged to the outside of the fuel cell 10.

Thus, as compared to a case in which no grooves 43 are provided, the amount of water discharged to the outside of the fuel cell 10 is increased. This improves the water discharge performance. Also, unlike a case in which no grooves 43 are provided, the generated water is prevented from remaining in the gas diffusion layer 15. Insufficient diffusion of oxidation gas due to the remaining water will not be caused. Thus, reaction of the fuel gas and the oxidation gas is unlikely to be diminished.

Particularly, in the present embodiment, In the second thin film 42 on the top surface of each crest section 23, one end of each groove 43 is connected to one of the passages 25, which are located on the opposite sides of the crest section 23, and the other end is connected to the other passage 25. Thus, a portion of the water in the gas diffusion layer 15 that is close to each groove 43 is pulled toward the opposite ends in the longitudinal direction of the groove 43 by the oxidation gas flowing through the passages 25 on the opposite sides of the crest sections 23. A portion of the water in the gas diffusion layer 15 that is close to the groove 43 is therefore readily discharged to the passages 25 via the groove 43, and the water is then readily discharged to the outside of the fuel cell 10 along with the flow of oxidation gas through the passage 25.

The power generation efficiency can be improved by soaking the cathode electrode layer 13 and the anode electrode layer 14 with a certain amount of water. In this regard, the thickness of the membrane electrode assembly 11 may be reduced. This allows the water generated in the cathode electrode layer 13 to readily move toward the anode electrode layer 14 along the electrolyte membrane 12. However, if more water than necessary remains in the gas diffusion layer 16, and surplus water remains in the vicinity of the anode electrode layer 14, fuel gas (hydrogen) cannot readily contact the anode electrode layer 14. This can reduce the reaction of the fuel gas and the oxidation gas in the membrane electrode assembly 11.

However, a portion of the water in the gas diffusion layer 16 that is close to each passage 35 is pulled toward the passage 35 by the fuel gas flowing through the passage 35. When moved into the passage 35, the water flows along with the fuel gas through the passage 35.

Further, in the present embodiment, the second thin films 52 of the second separator 31 also have grooves 53, which prevent more water than necessary from being retained in the gas diffusion layer 16. That is, a portion of the water in the gas diffusion layer 16 that is close to each groove 53 is pulled toward the passage 35 through the groove 53 and then flows along with the fuel gas in the passage 35.

As described above, the water that flows along with the fuel gas through the passage 35 is ultimately discharged to the outside of the fuel cell 10. This prevents surplus water from remaining in the vicinity of the anode electrode layer 14.

Further, in the present embodiment, as in the case of the above-described grooves 43, each groove 53 has an end connected to a passage 35 and another end connected to a different passage 35. Thus, for the same reason as the above-described grooves 43, a portion of the water in the gas diffusion layer 16 between the second thin film 52 and the anode electrode layer 14 that is located close to the groove 53 is pulled toward the opposite ends in the longitudinal direction of the groove 53. The water is thus readily discharged to the passages 35 through the groove 53. The water then flows along with the fuel gas through the passages 35 to be discharged to the outside of the fuel cell 10.

When acidic substances are generated as by-products of reaction in the electrolyte membrane 12, the separator bases 22, 32, which are made of stainless steel plates, may be eroded or corroded through electrochemical reaction with the acidic substances. At this time, iron ions are eluted from the separator bases 22, 32. This may degrade the performance of the components of the membrane electrode assembly 11, for example, the electrolyte membrane 12 and the catalyst (not shown).

However, in the present embodiment, elution of iron ions is suppressed by the first thin films 41, 51. Therefore, the first thin films 41, 51 prevent the performance of the components of the membrane electrode assembly 11 from being degraded due to eluted iron ions.

In addition to the ones listed above, the present embodiment has the following advantages.

If the hydrophilicity of the second thin films 42 in the first separator 21 is low, the water in the grooves 43 is likely to be repelled by the inner surfaces of the grooves 43 and is unlikely to move in the grooves 43. The water in the grooves 43 is thus unlikely to move to the passages 25.

However, in the present embodiment, since the second thin films 42 have a hydrophilicity higher than that of the separator base 22, the water in the grooves 43 is likely to be spread on the inner surfaces of the grooves 43. This allows the water in the grooves 43 to smoothly move to the passages 25.

Further, since the second thin films 52 of each second separator 31 have a hydrophilicity higher than that of the separator base 32, the water in the grooves 53 smoothly moves to the passages 35 as in the case of the first separator 21.

The second thin films 42, 52, which have the grooves 43, 53, are formed through ink jet printing. Thus, the shapes of the grooves 43, 53 in the second thin films 42, 52 can be changed easily through pattern adjustment of the ink jet printing.

In the second thin films 42, 52, the first thin films 41, 51 are exposed at the sections where the grooves 43, 53 are provided. In other words, the second thin films 42, 52 are not provided on the corresponding sections in the first thin films 41, 51. Thus, ink material does not need to be applied to the sections in the first thin films 41, 51 where the grooves 43, 53 will be formed. The grooves 43, 53 are therefore easy to form.

The above-described embodiment may be modified as follows.

<Regarding Separator Bases 22, 32>

The separator bases 22, 32 may be made of any metal other than stainless steel as long as it has conductivity. For example, the separator bases 22, 32 may be made of titanium.

<Regarding First Thin Films 41, 51 and Second Thin Films 42, 52>

The second thin films 42, 52 may be made of the same material as that of the first thin films 41, 51.

The second thin films 42, 52 may be provided on other sections of the crest sections 23, 33 or on the trough sections 24, 34 in addition to the top surfaces of the crest sections 23, 33. However, considering the troublesomeness and costs of formation of the second thin films 42, 52, the second thin films 42, 52 are preferably provided only on the top surfaces of the crest sections 23, 33.

If the second thin films 42, 52 are provided on sections other than the top surfaces of the crest sections 23, 33, the cross-sectional flow areas of the passages 25, 35 are reduced accordingly. Therefore, the second thin films 42, 52 are preferably provided only on the top surfaces of the crest sections 23, 33, where the second thin films 42, 52 are required.

In the above-described embodiment, the second thin films 42, 52 have a hydrophilicity higher than that of the separator bases 22, 32. However, the present disclosure is not limited to this.

One of the first thin film 41 on the first separator 21 and the first thin film 51 on the second separator 31 may be omitted.

One of the second thin film 42 on the first separator 21 and the second thin film 52 on the second separator 31 may be omitted.

<Regarding Grooves 43, 53>

The grooves 43, 53 may extend in a direction diagonally intersecting with the direction in which the crest sections 23, 33 extend.

Figure 3:
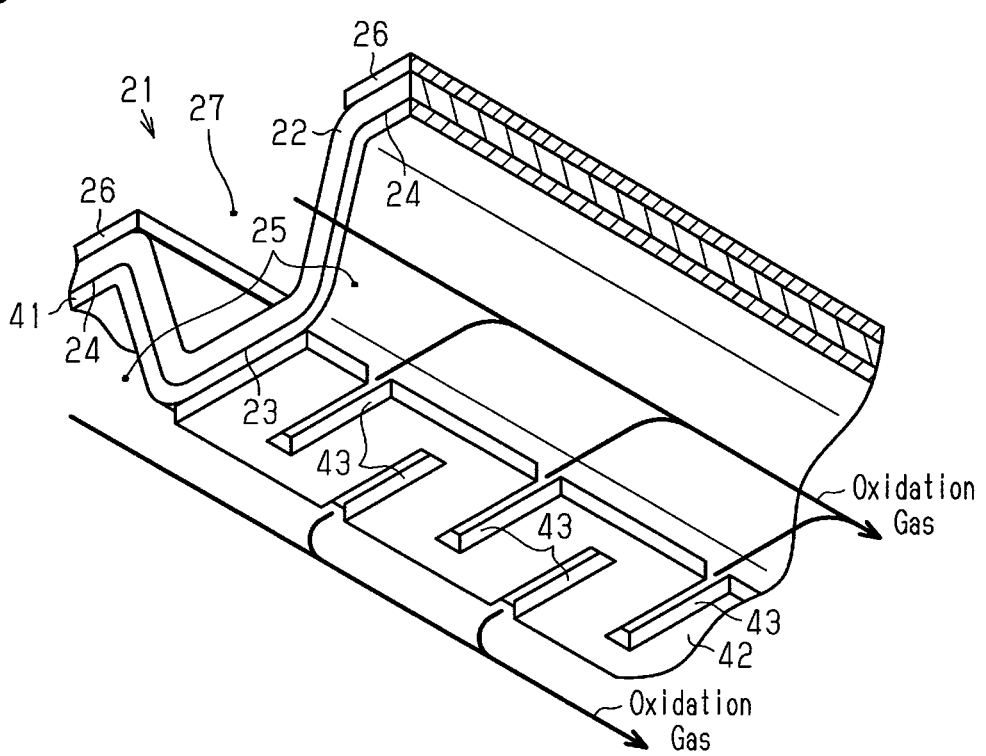
FIG. 3 is a partial perspective view showing a first separator according to a modification in which grooves different from those in FIG. 2 are provided in a second thin film.
Figure 4:
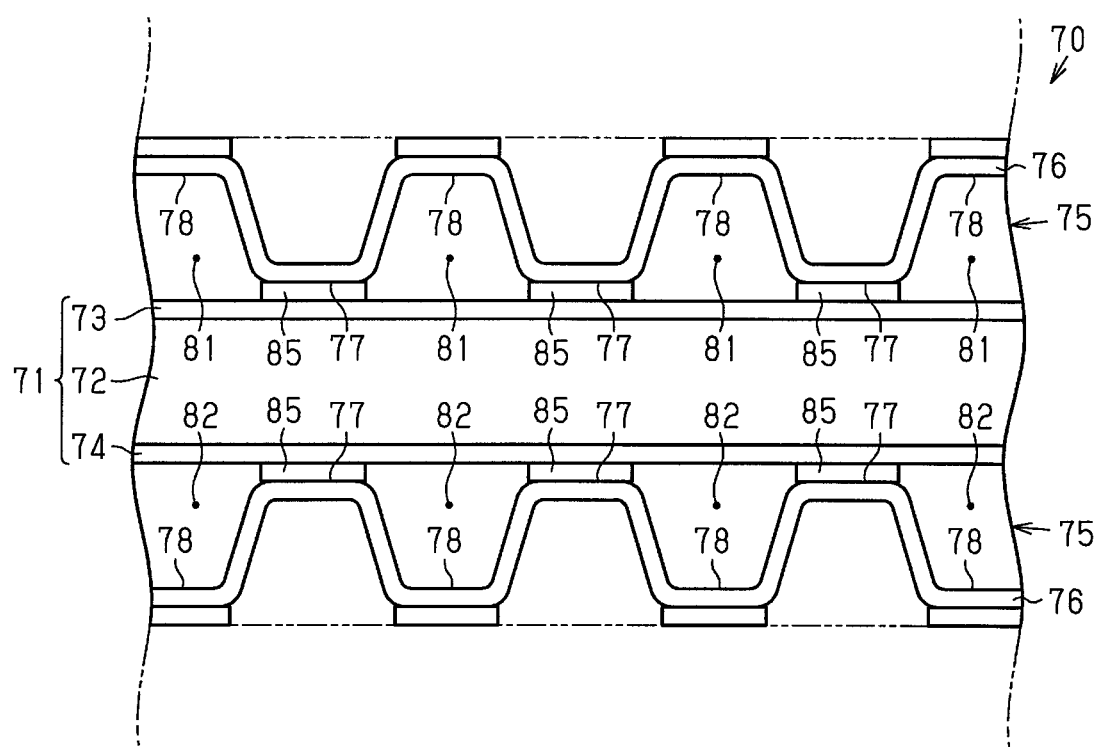
FIG. 4 is a diagram of a conventional fuel cell, schematically illustrating a state in which a membrane electrode assembly is sandwiched by separators from the opposite sides in the thickness direction.

As shown in FIG. 3, each groove 43 of the first separator 21 may have an end connected to the passage 25 and another end that is not connected to the passage 25. In this case, the water located in the gas diffusion layer 15 is readily discharged to the passage 25 through the groove 43. This is because, since one of the ends of each groove 43 is closed, the water in the groove 43 is likely to be pulled by the oxidation gas flowing through the passage 25, promoting discharge of water.

The same modification may be applied to the grooves 53 of the second separator 31 for the same reason discussed above.

When each crest section 23 of the first separator 21 has multiple grooves 43, each of which has only one end connected to a passage 25, at different positions in the direction in which the crest section 23 extends as described above, each adjacent pair of grooves 43 are preferably connected to different passages 25 on the opposite sides of the crest section 23. This is because such a configuration allows the water close to the grooves 43 in the gas diffusion layer 15 to be substantially evenly pulled toward and flow to the passages 25 on the opposite sides.

The same modification may be applied to the grooves 53 of the second separator 31 for the same reason discussed above.

Each pair of grooves 43 that are adjacent to each other in the direction in which the crest section 23 extends may be connected to the same one of the passages 25 on the opposite sides of the crest section 23. The same modification may be applied to the grooves 53.

One of the groove 43 in the first separator 21 and the groove 53 in the second separator 31 may be omitted.

The depths of the grooves 43, 53 may be set smaller than the thickness of the second thin films 42, 52 at sections where the grooves 43, 53 are not provided. In this case, parts of the second thin films 42, 52 are provided in sections where the grooves 43, 53 are provided. Unlike the above-described embodiment, the first thin films 41, 51 are not exposed at the sections of the thin films 42, 52 where the grooves 43, 53 are provided. Ink jet printing allows for formation of the second thin films 42, 52 that include sections of a thickness smaller than other parts.

<Another Modification>

The first and second separators 21, 31 may be employed in a fuel cell that does not have the gas diffusion layers 15, 16.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A separator for a fuel cell, the separator being used in a fuel cell having a membrane electrode assembly, wherein
the membrane electrode assembly includes an electrolyte membrane and electrode layers joined to opposite sides of the electrolyte membrane in a thickness direction,
the separator for a fuel cell comprises:
a metal separator base that is arranged on an outer side of the membrane electrode assembly in the thickness direction and has conductivity;
a plurality of crest sections that are provided in the separator base and protrude toward the membrane electrode assembly; and
a plurality of trough sections that are provided in the separator base and recessed in a direction opposite to a direction in which the crest sections protrude,
the crest sections and the trough sections are alternately arranged in a direction along a plane of the membrane electrode assembly and extend parallel to each other,
regions surrounded by the respective trough sections and a corresponding electrode layer each constitute a passage that supplies oxidation gas or fuel gas to the electrode layer,
a first thin film having conductivity and a corrosion resistance higher than that of the separator base is placed over entire surfaces of the crest sections and the trough sections that face the corresponding electrode layer,
a second thin film having conductivity is placed at least on each of parts of the first thin film that are placed on top surfaces of the crest sections,
the second thin film on the top surface of each crest section has a groove, and
at least one end of the groove is connected to the passage.

2. The separator for a fuel cell according to claim 1, wherein
in the second thin film on the top surface of each crest section,
one end of the groove is connected to one of the passages, which are located on opposite sides of the crest section, and the other end of the groove is connected to the other passage.

3. The separator for a fuel cell according to claim 1, wherein the first thin film is exposed at positions where the grooves are provided.

4. The separator for a fuel cell according to claim 1, wherein the first thin film is made of a material including plastic and conductive particles.

\* \* \* \* \*